United States Patent
Dugue et al.

(10) Patent No.: US 6,910,879 B2
(45) Date of Patent: Jun. 28, 2005

(54) COMBUSTION METHOD COMPRISING SEPARATE INJECTIONS OF FUEL AND OXIDANT AND BURNER ASSEMBLY THEREFOR

(75) Inventors: Jacques Dugue, Montigny le Bretonneux (FR); Thierry Legiret, Toussus le Noble (FR); Rémi Pierre Tsiava, St Germain les Corbeil (FR); Olivier Louedin, Lyons (FR)

(73) Assignee: L'Air Liquide, Société Anonyme à Directoire et Conseil de Surveillance pour l'Etude et l'Exploitation des Procédés Georges Claude, Paris (FR)

(*) Notice: Subject to any disclaimer, the term of this patent is extended or adjusted under 35 U.S.C. 154(b) by 0 days.

(21) Appl. No.: 10/474,268
(22) PCT Filed: Apr. 4, 2002
(86) PCT No.: PCT/FR02/01170
   § 371 (c)(1),
   (2), (4) Date: Apr. 12, 2004
(87) PCT Pub. No.: WO02/081967
   PCT Pub. Date: Oct. 17, 2002

(65) Prior Publication Data
   US 2004/0157178 A1 Aug. 12, 2004

(30) Foreign Application Priority Data
   Apr. 6, 2001 (FR) .......................................... 01 04738

(51) Int. Cl.[7] ................................................ F23C 5/00
(52) U.S. Cl. ............................. 431/8; 431/10; 431/190
(58) Field of Search .............................. 431/8, 10, 175, 431/188, 190

(56) References Cited

U.S. PATENT DOCUMENTS

| | | | | |
|---|---|---|---|---|
| 5,431,559 A | * | 7/1995 | Taylor | 431/164 |
| 5,954,855 A | * | 9/1999 | Gitman et al. | 75/10.42 |
| 6,126,438 A | * | 10/2000 | Joshi et al. | 431/161 |
| 6,544,029 B2 | * | 4/2003 | Marin et al. | 431/165 |
| 6,659,762 B2 | * | 12/2003 | Borders et al. | 431/8 |

* cited by examiner

*Primary Examiner*—Stephen Gravini
(74) *Attorney, Agent, or Firm*—Linda K. Russell

(57) ABSTRACT

A method of combustion and a burner assembly wherein at least one fuel and at least one oxidizer are injected separately. The oxidizer comprises a primary oxidizer stream and a secondary oxidizer stream. The primary oxidizer stream is divided into at least two portions. One portion is injected close to the fuel whereby generating a first incomplete combustion. The second portion is injected downstream of the first injection point with the fuel source consisting of the remaining uncombusted fuel of the first incomplete combustion in addition to the fuel. The secondary oxidizer stream is injected downstream from the primary oxidizer stream, whereby resulting in combustion with the unreactive fuel gases remaining from the first combustion.

49 Claims, 7 Drawing Sheets

Figure 1:
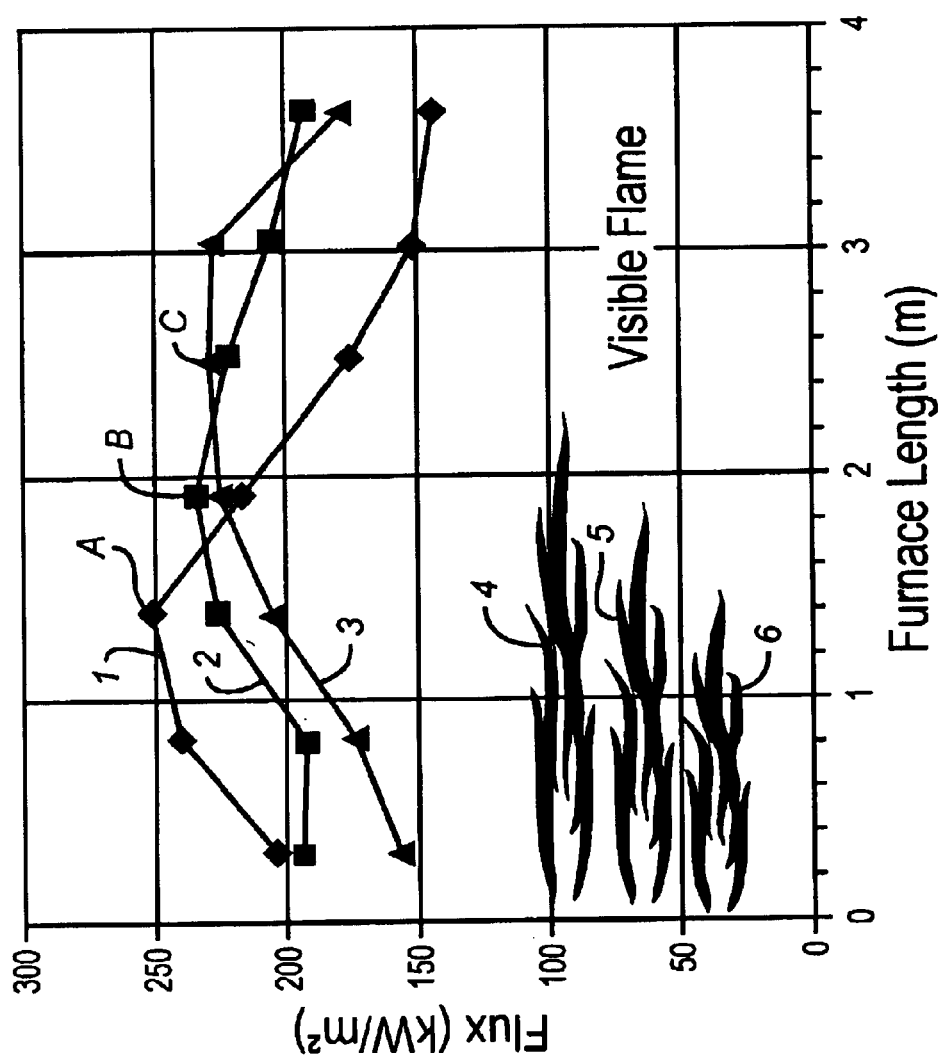

COMBUSTION METHOD COMPRISING SEPARATE INJECTIONS OF FUEL AND OXIDANT AND BURNER ASSEMBLY THEREFOR

The present invention relates to a method of combustion in a furnace into which at least one fuel and at least one oxidizer are injected separately, the stream of oxidizer comprising a stream of primary oxidizer and a stream of secondary oxidizer, the stream of primary oxidizer being injected close to the fuel so as to generate first incomplete combustion, the gases emanating from this first combustion also including at least part of the fuel, whereas the stream of secondary oxidizer is injected at a certain distance from the stream of fuel that is greater than the distance between the stream of fuel and the stream of primary oxidizer closest to the stream of fuel, so as to enter into combustion with the fuel present in the gases emanating from the first combustion. The invention also relates to a burner assembly for implementing such a method.

The performance of a combustion system in an industrial furnace is characterized by at least two factors:

- the discharges of atmospheric pollutants (NOx, dust, etc.) which must be in an amount less than the limit set by the legislation;
- the temperature of the walls of the furnace and of the charge to be heated, which must lie between two limits in relation to the requirements of the method in terms of product quality and energy consumption.

Changes in the legislation regarding the emissions of atmospheric pollutants, especially nitrogen oxides and dust, have recently resulted in a significant change in combustion technologies.

Over and above the need to minimize the emission of pollutants, the method of combustion in an industrial furnace must be tailored to the function of the furnace.

For example, a glass production furnace must comply with the wall and bath temperature characteristics so as to avoid any quality defects in the product (bubbles, etc.) and premature aging of the refractory surfaces.

In a steel billet reheat furnace, the billets have to be heated uniformly so as to prevent them from deforming before they enter the rolling mill.

In a melting furnace for ferrous or nonferrous metal products, uniform heating must be provided along the charge so as to limit any increase in energy consumption and premature wear of the refractories.

It is therefore essential to control the temperature field (that is to say the range of temperatures between which a temperature may vary) in an industrial furnace in order to achieve the quality of the product and the performance of the method. The temperature field for the refractory surfaces and for the charge along the main axis of a furnace depends on the number, the spacing and the power distribution of the burners placed perpendicular to this axis. This is the case, for example, of billet reheat furnaces and for glass furnaces in which burners are located on either side of the charge. The temperature field along the axis parallel to the flame depends on the length, the power and the momentum of the flame, and also on the geometry of the zone to be heated.

It is known, for example from U.S. Pat. No. 4,531,960 and U.S. Pat. No. 4,604,123, to vary the length of an oxygen flame by using a swirl stream of air around the axis of the flame. This parameter has a strong influence on the length and the stability of the flame. Another parameter that may be controlled is the degree of staging of the oxidizer or of the fuel (fraction of the flow introduced separately from the primary combustion zone). Staged-combustion burners are for example described in patents U.S. Pat. No. 4,622,007, U.S. Pat. No. 4,642,047, U.S. Pat. No. 4,797,087, U.S. Pat. No. 4,718,643 and Re. 33 464, in which the use of air and oxygen as oxidizers is in particular described.

Burners using oxygen as oxidizer, and particularly burners using a gaseous fuel, do not in general offer the possibility, for a given power and a given oxygen factor, for the flame length and momentum characteristics to be continuously varied. Such burners are described, for example, in U.S. Pat. No. 5,772,427, U.S. Pat. No. 5,934,893, U.S. Pat. No. 5,984,667 and U.S. Pat. No. 6,068,468. However, it is possible to modify the length of the flame from such burners by changing the fuel injectors. It should be noted that the use of smaller-diameter injectors results in an increase in the momentum, and therefore the shortening of the flame and the displacement of the maximum heat flux downstream (and vice versa). FIG. 1, which illustrates the length of visible flame and the axial heat flux of a burner with a power of 1 MW described in U.S. Pat. No. 5,772,427 and U.S. Pat. No. 5,934,893, clearly shows this result. Conversely, shortening the flame and increasing the total momentum have a priori opposite effects on the displacement of the thermal profile of the flame. Combining both phenomena causes the maximum heat flux to shift downstream because one of the two effects is dominant. The origin of the x-axis in FIG. 1 is the internal wall of the furnace that coincides with the internal face of the burner. The downstream direction is therefore toward increasing axial lengths.

It is also known, from U.S. Pat. No. 5,302,112, to inject gases at different velocities into a furnace, the velocity variations (both absolute and relative) allowing the flame length and momentum to be varied.

It is also known, from U.S. Pat. No. 5,346,524, to inject the fuel and the oxidizer separately, using separate injectors placed alternately, near one another, at a distance of around 15 cm.

U.S. Pat. No. 5,601,425 discloses a staged-combustion system in which liquid fuel oil is injected into the center of a peripheral stream of oxygen, whereas air is injected quite a long distance from the oxygen.

The object of the invention is to meet the two requirements of optimizing the thermal profile along the axis of the flame and of minimizing the nitrogen oxide emissions.

The method according to the invention makes it possible in particular to adjust the performance of a flame to the environment in which it is placed, in terms of thermal profile of the furnace and of the charge, flame length and emission of nitrogen oxides and dust.

The method according to the invention is characterized in that the stream of primary oxidizer is itself divided into at least two primary streams, namely at least one rapid-mixing first stream of primary oxidizer injected into the stream of fuel or in contact with the stream of fuel, so as to rapidly undergo a combustion reaction with the fuel that surrounds it, and at least one slow-mixing second stream of primary oxidizer injected at a distance $d_1$ from the first stream of primary oxidizer, so as to mix less rapidly with the stream of fuel than at least one of the rapid-mixing streams of primary oxidizer.

To be able, according to the invention, to control the momentum and the length of the flame independently, the combustion system according to the invention will preferably involve two regulating parameters. In addition, because it is preferably desirable for the thermal profile of the furnace in which the method is implemented to be accurately controlled, the first regulating parameter will preferably consist of the ratio of the flow of oxygen provided by the secondary oxidizer to the total flow of oxygen provided by the primary and secondary oxidizers. This flow of secondary oxidizer will be provided by an injector or a lance.

Preferably, the method according to the invention is characterized in that the distance $d_1$ is less than or equal to 30 cm, preferably 25 cm.

According to another variant of the invention, the distance $d_1$ is less than or equal to ten times the diameter $d_3$ of the slow-mixing stream of primary oxidizer.

In general, the sum of the flow rates of primary oxidizer and of secondary oxidizer will preferably be approximately stoicheometric with respect to the flow of fuel, within a range of ±15%.

According to another variant of the invention, the stream of secondary oxidizer itself consists of a plurality of streams of secondary oxidizer.

Preferably, the amount of secondary oxidizer will be between 0% and 90%, preferably between 10% and 90%, of the total amount of oxidizer injected.

More preferably, the total amount of secondary oxidizer is between 50% and 90% of the total amount of oxidizer injected, the primary oxidizer representing an amount between 10% and 50% of the total amount of oxidizer.

In general, the total amount of secondary oxidizer will preferably be between 60% and 80% of the total amount of oxidizer injected, the amount of primary oxidizer being between 20% and 40% of this same total amount.

According to one method of implementing the invention, the sum of the areas of the cross sections of the secondary oxidizer injection ports is greater than or equal to 2.5 cm².

Preferably, the distance between the rapid-mixing stream of oxidizer of the primary oxidizer and the stream of secondary oxidizer will be equal to $d_2$, where $d_2 \geq 5$ D and $d_2 \geq d_1$ and preferably 10 D$\leq d_2 \leq$50 D, D being the diameter of the circle with the same area as the area of the secondary oxidizer injector through which the stream of secondary oxidizer is injected. If a number i of secondary oxidizer injectors (i possibly varying from 1 to 25), placed at a distance $d_{2i}$ and of equivalent diameter $D_i$, are used, then $d_{2i}$ and $D_i$ must satisfy the above formulae individually.

According to another aspect of the invention, the rapid-mixing first stream(s) of primary oxidizer represents (represent) from 5 to 40 vol % of the total amount of oxidizer, whereas the slow-mixing second stream(s) of primary oxidizer represents (represent) from 5 to 95 vol % of the total amount of oxidizer, the possible balance of oxidizer being provided by the streams of secondary oxidizer.

According to an implementation variant, the slow-mixing second stream of primary oxidizer itself consists of a plurality of streams.

According to another aspect of the invention, the second stream of primary oxidizer consists of two approximately identical streams located approximately at the same distance $d_1$ from the rapid-mixing first stream of primary oxidizer, the three streams of oxidizer lying approximately in the same plane.

According to a variant of the invention, at least one slow-mixing second stream of primary oxidizer does not lie in the plane formed by the first stream of primary oxidizer and the stream of secondary oxidizer.

When good symmetry of the combustion assembly is desired, the plurality of second streams of primary oxidizer will preferably be arranged uniformly around the first stream of primary oxidizer, another alternative being that the plurality of second streams of primary oxidizer will be arranged symmetrically with respect to a plane containing the first stream of primary oxidizer.

Of course, it is important to control the gas ejection velocities. For this purpose, the fuel injection velocity will preferably be between 20 m/s and Mach 2 and more preferably between 20 m/s and 300 m/s.

Apart from the various possibilities, well known per se, for injecting the fuel used in the method according to the invention, the fuel may be preheated before being injected. Another possibility is that the fuel may be pulsed during its injection, the frequency of these pulses being preferably between 0.1 and 3 Hz and more preferably between 0.1 and 1 Hz. For further details about the way of injecting one or more fluids in a "pulsed" mode, the reader may refer to the article entitled *"Oscillating Combustion Technology Boosts Furnace Efficiency"* by Eric Streicher, Ovidiu Marin, Olivier Charon and Harley Borders, published in industrial Heating, February 2001, incorporated into the present application by way of reference.

Likewise, many variants are possible regarding the injection of the oxidizer. In general, the rapid-mixing primary oxidizer injection velocity will preferably be between 20 m/s and Mach 2.

Also preferably, the slow-mixing primary oxidizer injection velocity will be between 10 m/s and Mach 1.

According to a preferred variant of the invention, the secondary oxidizer injection velocity will be between 20 m/s and Mach 2.

To reduce the fuel consumption, at least one of the streams of oxidizer will preferably be preheated before it is injected, it being possible for its injection velocity to reach at most a velocity of Mach 2.

Within the context of pulsed combustion (with the meaning of this term as indicated above), it is also possible for this pulsing to be carried out on at least one of the streams of oxidizer, it being understood that the fuel itself may or may not then be "pulsed", depending on the desired results. According to this variant at least one of the streams of oxidizer is injected in pulses, the frequency of these pulses being between 0.1 and 3 Hz and preferably between 0.1 and 1 Hz.

The composition of the oxidizer may vary and, depending on the conditions or the results that are desired, this composition will preferably comply with at least one of the requirements defined below:

the secondary oxidizer may consist of a mixture of air, preferably preheated air, and oxygen. In general, the oxidizer, and more particularly the secondary oxidizer, may also consist of a mixture of gases of greater or lesser oxidizing character, especially containing from 5 to 100% oxygen (preferably between 10 and 100 vol %), from 0% to 95% $CO_2$ (preferably between 0 and 90% $CO_2$), from 0 to 80% nitrogen (preferably between 0 and 70%), from 0 to 90% argon, with at least 3% oxygen in the mixture. The mixture may also contain other constituents and especially water vapor and/or NOx and/or SOx;

the air will preferably provide from 5% to 85% by volume of the total oxygen flow of the secondary oxidizer, the balance being provided by oxygen-enriched air or substantially pure oxygen; and the air will preferably constitute from 15 to 40 vol % of the total oxygen.

A variant of the invention provides for the injection of a single fuel or of several fuels, which may be of the same type (different gases for example) and/or of different type (gases and fuel oils, for example).

The invention also relates to a combustion assembly that makes it possible in particular to implement the method according to the invention. Thus, the invention relates to a separate-injection combustion assembly formed from a block having at least one fuel injection port and at least one oxidizer injection port, and which is characterized in that the fuel injection port has at least one longitudinal axis of symmetry in the direction of flow of the fuel, a first oxidizer injector, that also has a longitudinal axis of symmetry, being placed in the fuel injection port, the two longitudinal axes of symmetry being approximately parallel, a second oxidizer injection port being placed at a distance $d_1$ from the axis of symmetry of the first oxidizer injector, where $d_1 \leq 30$ cm.

Preferably, this assembly will include at least one second block in which a third oxidizer injection port of diameter D is provided, which port is placed at a distance $d_2$ from the axis of symmetry of the first oxidizer injector, where:

$d_2 \geq 5$ D and $d_2 \geq d_1$, and preferably

10 D $\leq d_2 \leq$ 50 D.

According to a variant of the invention, $d_1 \leq 10 d_3$, $d_3$ being the diameter of the slow-mixing stream of primary oxidizer (or its equivalent if the cross section of the injector is not circular), while preferably D$\geq$0.5 cm.

Preferably, the block of the combustion assembly will have a plurality of fuel injection ports and, preferably, a plurality of first oxidizer injectors and/or a plurality of second oxidizer injection ports.

According to an alternative embodiment, at least one fuel injection port will comprise a liquid fuel injector, while, according to another embodiment of the invention, the block may have several separate fuel injection ports for injecting one or more fuels.

According to an advantageous embodiment, the assembly according to the invention will preferably include a first flow-dividing valve for dividing the total flow of oxidizer, which runs, on the one hand, into a primary oxidizer line and, on the other hand, into a secondary oxidizer line connected to the third oxidizer injection port, the primary oxidizer line being connected to a second flow-dividing valve that is connected, on the one hand, to the first oxidizer injector and, on the other hand, to the second oxidizer injection port.

According to an alternative embodiment of the invention, the third secondary oxidizer injection port may be an injector having two cross sections (or multiple cross sections) so as to be able to vary the velocity and the momentum of the oxidizer without modifying the flow rate of the oxidizer.

If the same oxidizer is used as primary oxidizer and secondary oxidizer, that is to say especially when a staged-type combustion is carried out, the cross sections of the secondary oxidizer injectors must be such that the total momentum of the various streams of oxidizer introduced by the burner for a 50% staging factor is greater than its corresponding value for a zero staging factor.

(The total momentum is calculated as the sum of the products of the velocity of each oxidizer stream multiplied by its mass flow rate, taking into account all the streams of oxidizer introduced by the burner).

The advantage of the features described above is that, for a degree of staging greater than 50%, the length of the flame and the momentum increase simultaneously with the degree of staging, unlike in the technique consisting in changing an injection pipe. If the burner uses only the same type of oxidizer, the staging factor is the ratio of the flow of the secondary streams of oxidizer to the total flow of oxidizer (primary plus secondary). If one of the oxidizers is different from the other, for example air and oxidizer, in the ratio of the flows only the proportion of oxygen or oxidizer in each of the streams will be taken into account. The use of a parameter allowing the length of the flame and the total momentum of the burner to be increased simultaneously allows the position of maximum heat transfer to be accurately controlled.

According to the invention, it is preferable to use a second regulating parameter that consists in dividing the flow of primary oxygen between a flow that mixes very rapidly with the fuel and a flow that mixes comparatively slowly. This second regulating parameter may therefore be chosen as the fraction of primary oxygen introduced via the rapid-mixing injection.

The invention will be more clearly understood with the aid of the following implementation examples, in conjunction with the figures that show:

FIG. 1, curves giving the value of the heat flux along the axis of the flame of a 1 MW burner of known type according to its position in the furnace. (The x-axis in FIG. 1 is taken from the internal wall of the furnace, that coincides with the internal face of the burner. The downstream direction is therefore toward increasing axial lengths); and FIG. 2, an axial crown temperature profile as a function of the length of the flame.

FIG. 1 shows curves giving the heat flux (in kW/m$^2$) of the flame as a function of longitudinal distance (in m) along the furnace. The oxyfuel burner (not shown) is placed on the rear wall of the furnace (x=0).

Curve 1 shows the heat flux for a flame of very low momentum. This corresponds to flame 4, the visible part of which is relatively long.

Curve 2 shows the heat flux of flame 5 (all other things being equal) with a low momentum, this flame 5 being slightly shorter than flame 4.

Curve 3 shows the heat flux of flame 6 (all other things being equal) having a high momentum, flame 6 being shorter than flame 5. It should be pointed out that the hot spot of these flames (A in the case of flame 4, B in the case of flame 5 and C in the case of flame 6, respectively) is far from the tip of the burner (rear wall of the furnace), whereas the length of the visible flame decreases when the momentum of the flame increases (comparative curves produced from a 1 MW burner sold by the Proprietor under the brand name ALGLASS).

Figure 2:
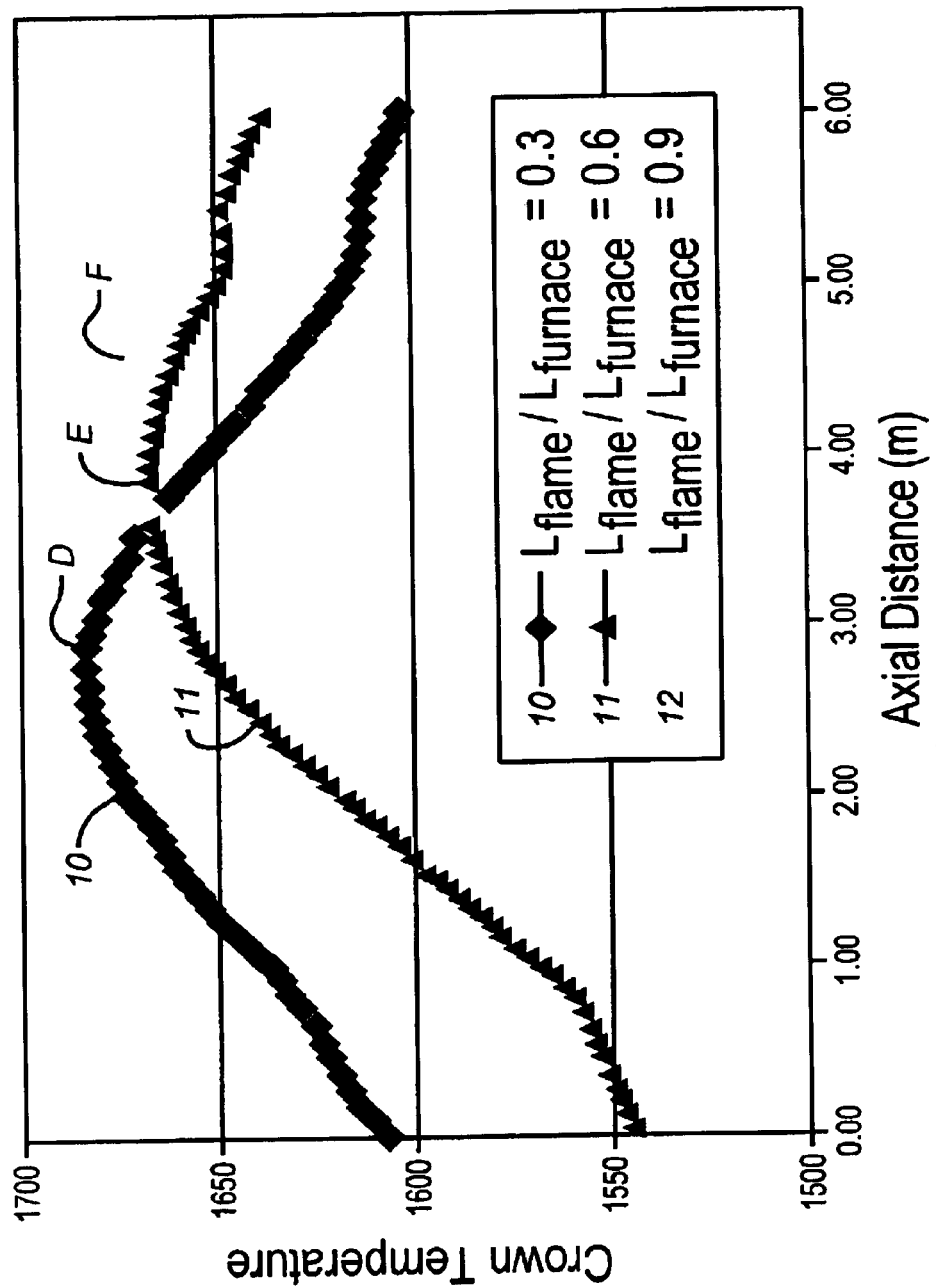

FIG. 2 shows three curves giving the crown temperature of the same furnace as a function of the length of the flame produced, each flame having, however, the same momentum (low momentum with a mean velocity of 30 m/s for the three flames). The burner used is a 2 MW burner of the same type as above. For a short flame 10, the temperature maximum D is approximately 3 m from the rear wall of the furnace, while the increase in the flame length allows the position of the maximum crown temperature to be shifted toward the front wall of the furnace (E, maximum temperature for curve 11, is located just under 4 m from the rear wall of the furnace, whereas F, the maximum temperature for curve 12, is located at about 4.50 m from the same wall).

Figure 3A:
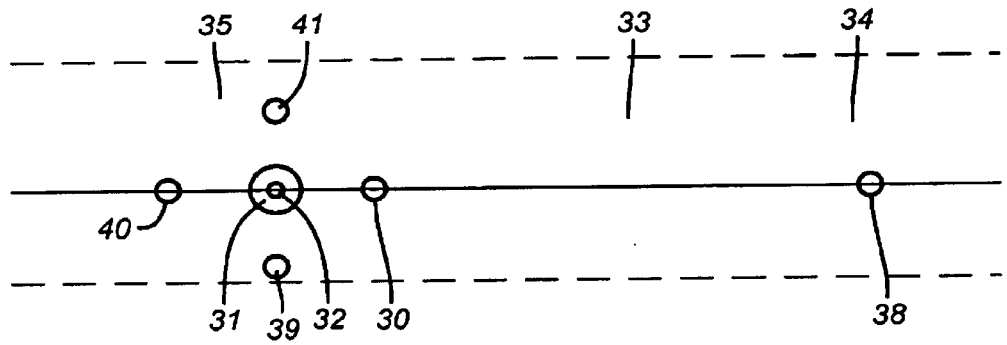
Figure 3B:
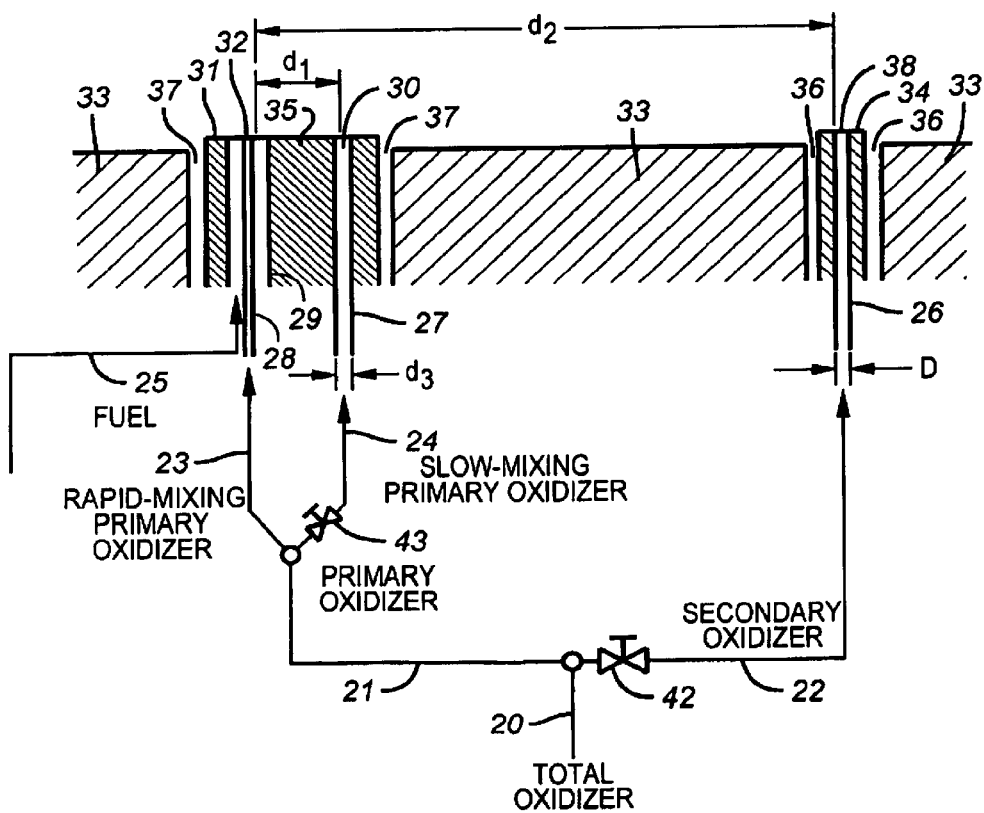

FIG. 3 shows a partial schematic top view (FIG. 3a) and sectional view (FIG. 3b) of an example of a combustion assembly according to the invention for implementing the method according to the invention.

The combustion assembly is placed here in a refractory block 33, in which two blocks 34 and 35 respectively have been placed.

The preferably cylindrical block 34 is pierced by a duct (or injector) 26, the orifice of which opens into the block at 38. This duct or injector 26 (possibly a hollow cylindrical metal injector may be slipped into the cylindrical bore 26) has a diameter (at 38) of D (if the injector is not cylindrical, D represents the diameter of the circle having the same area as the cross section of the injector at 38). This block 34 is slid into the cylindrical sleeve 36 in the block 33. The duct 26 receives the secondary oxidizer 22.

The block 35 includes a duct 28 for injecting the rapid-mixing primary oxidizer 23, the duct 28 being placed concentrically in the duct (or injector) 29 into which the fuel 25 is injected. Placed at a distance $d_1$ is the injector (or duct) 27 into which the slow-mixing primary oxidizer is injected. This injector 27 has a cross section of diameter $d_3$ at 30, at the point where said injector 27 emerges ($d_3$ is the equivalent diameter as defined above if the cross section is not circular). The block 35 is housed in the bore 37. The total oxidizer line 20 divides into a primary oxidizer line 21 and a secondary oxidizer line 22 in which a first control valve 42 is placed, said valve dividing the flow of oxidizer between 21 and 22 (according to, of course, the respective diameters of said lines). It is also possible to place the valve 42 in the line 21 arm if it is desired for there to be no regulating, including the case in which the flow of secondary oxygen may be zero. The line 21 itself divides into two lines 23 and 24 with a valve 43 in one of them, according to whether it is desired to be able to eliminate the flow of oxidizer in the branch 23 or the branch 24. (Of course, it is possible to provide a valve in each of these branches, and likewise it is possible to provide a valve in the branch 21 in addition to that of the valve 42 in the branch 22).

When operating this system, the oxygen may be divided between the various lines according to the results that it is desired to obtain, said lines having respective diameters such that different or identical oxygen injection velocities are obtained in the various injectors.

Of course, the injector 27 may be placed in such a way that its end 30 is located at 39 or 40 or 41 or at any point on the circle of radius $d_1$. It is also possible to have simultaneously several ports 30 and/or 39 and/or 40 and/or 41, the injectors of which are connected together and the slow-mixing oxygen distributed in these various injectors. It is thus also possible to create a supersonic-velocity oxidizer burner/injector by providing an injector 28 having, close to 32, an end of convergent/divergent shape (so-called Laval nozzle), while the relative proportions of oxygen and of fuel may or may not be modified according to what it is desired to obtain. Thus, with the injector 28 fitted with a supersonic nozzle, it is possible either to inject oxidizer alone, at supersonic velocity, via 28 and 32 or to surround this supersonic stream with a flame that would be produced using a subsonic injection of fuel via 29 and of oxidizer via 27, optionally supplemented with an injection of oxidizer via 26, or to produce a subsonic flame only using 29 and 27 (plus 26 if necessary or desired).

Figure 4:
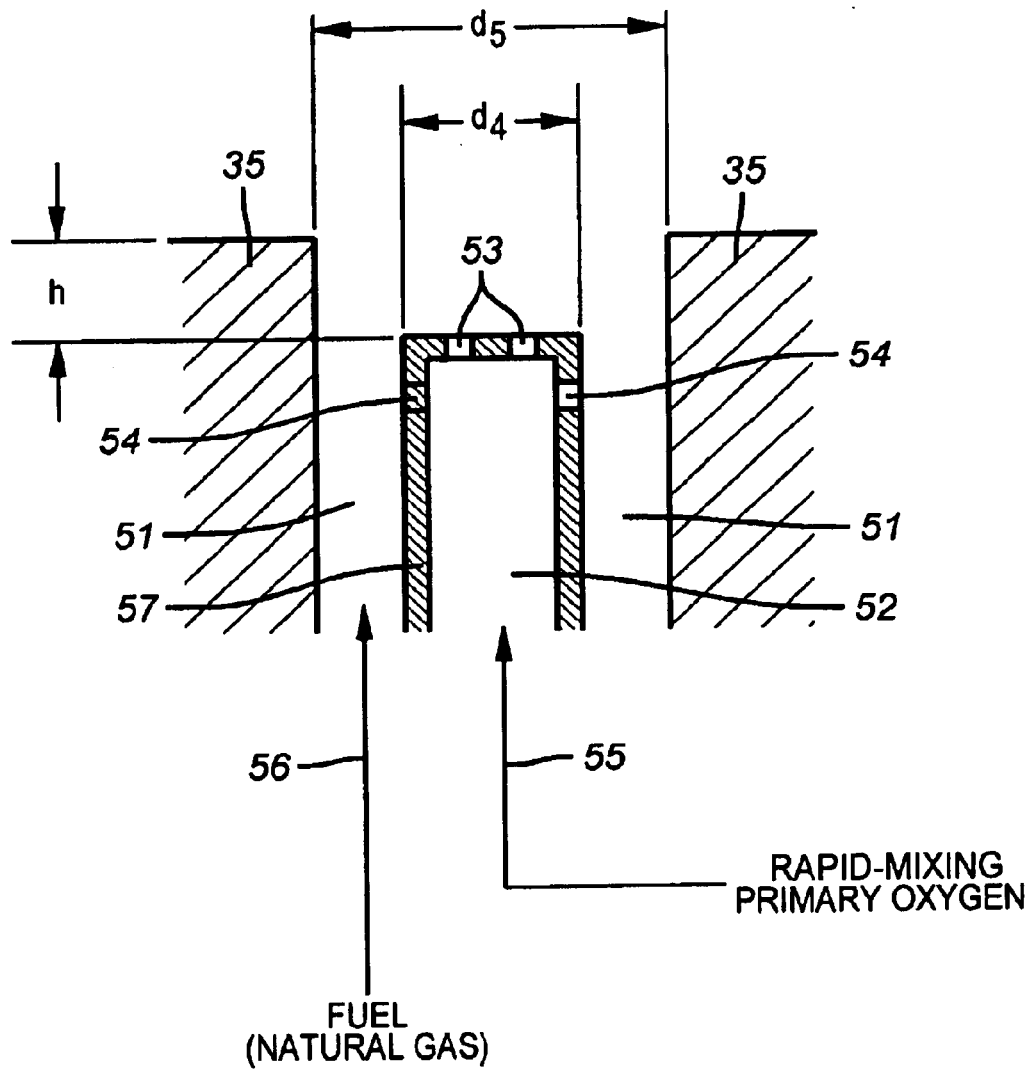

FIG. 4 shows a detail of an alternative embodiment of the injection of the rapid-mixing primary oxidizer and of the fuel when the latter is natural gas.

The refractory block 35 has a bore 51 of diameter $d_5$ (or diameter of the circle of equivalent area). Placed in this space 51 is a preferably cylindrical natural gas injector 52 of diameter $d_4$ inserted set back in such a way that there is a distance h between the top of this injector 52 and the surface of the refractory block 35. The injector 52 is hollow so as to be supplied with oxidizer and preferably has at least one hole 53 in its upper surface and/or at least one hole 54 in its side wall (vertical wall in FIG. 4).

The natural gas 56 is injected into the annular space lying between the vertical walls of the bore 51 and the vertical walls 57 of the injector 52, between which vertical walls 57 the oxidizer is injected.

(If fuel oil is used as fuel, the rapid-mixing primary oxygen will be the fluid for spraying the fuel oil, this oxygen possibly being used with air as spray fluid).

Figure 5:
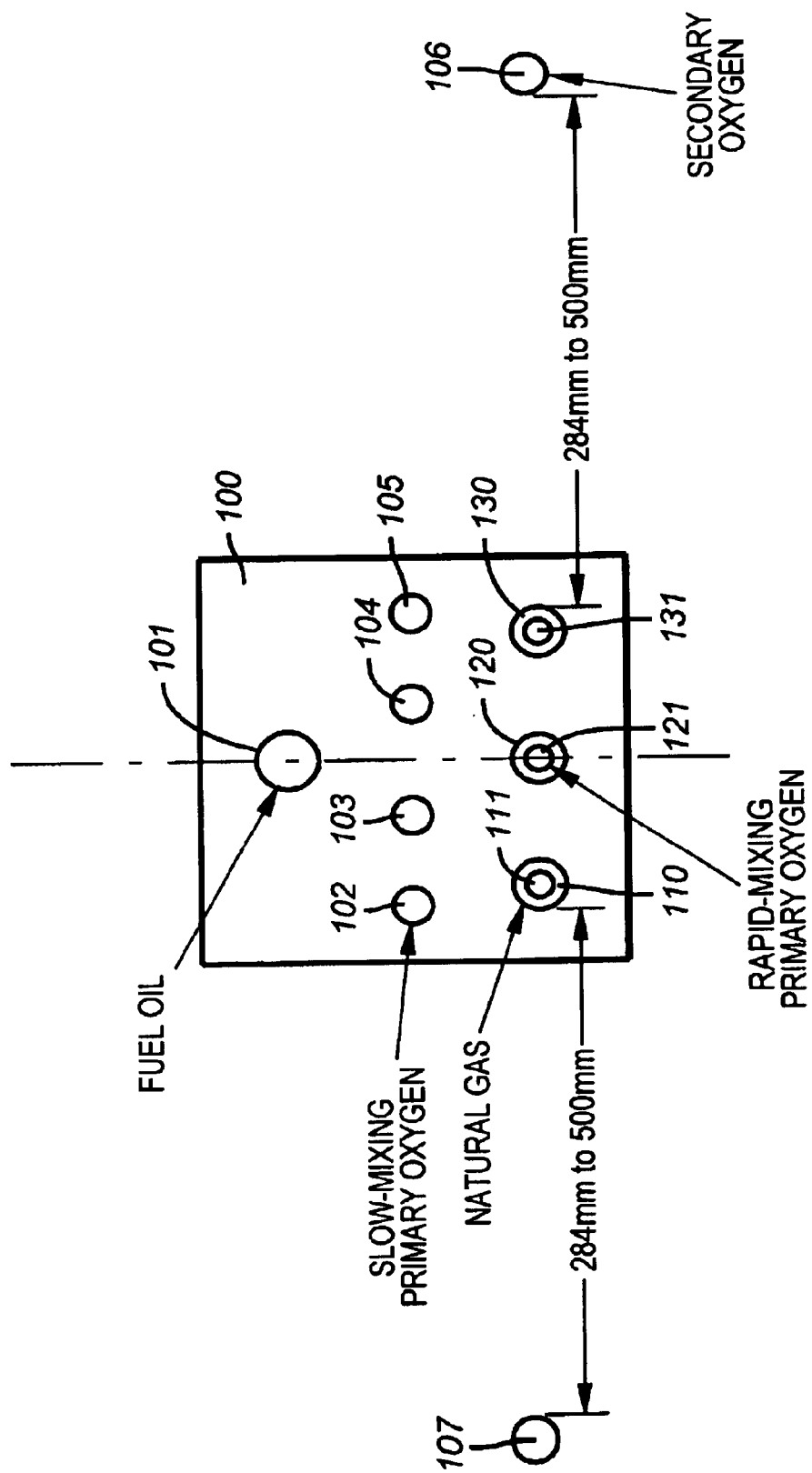

FIG. 5 shows an alternative embodiment of the invention, in schematic form only.

The refractory block 100 has, in the upper part, a liquid fuel oil injection port 101, if it is desired to operate the combustion system entirely or partly with fuel oil. Arranged along a horizontal row placed beneath the port 101 are a plurality of slow-mixing primary oxygen injection ports 102, 103, 104 and 105.

Placed in the lower part of the block 100 is a row of three concentric orifice assemblies 110/111, 120/121, 130/131 (there may be more or fewer of these), for respectively injecting fuel, such as natural gas, and oxidizer, such as rapid-mixing primary oxygen (see FIG. 3 for more details). Placed at a distance $d_2$ on either side of the block are, for example but not necessarily, oxygen injection ports 106 and 107.

Figure 6:
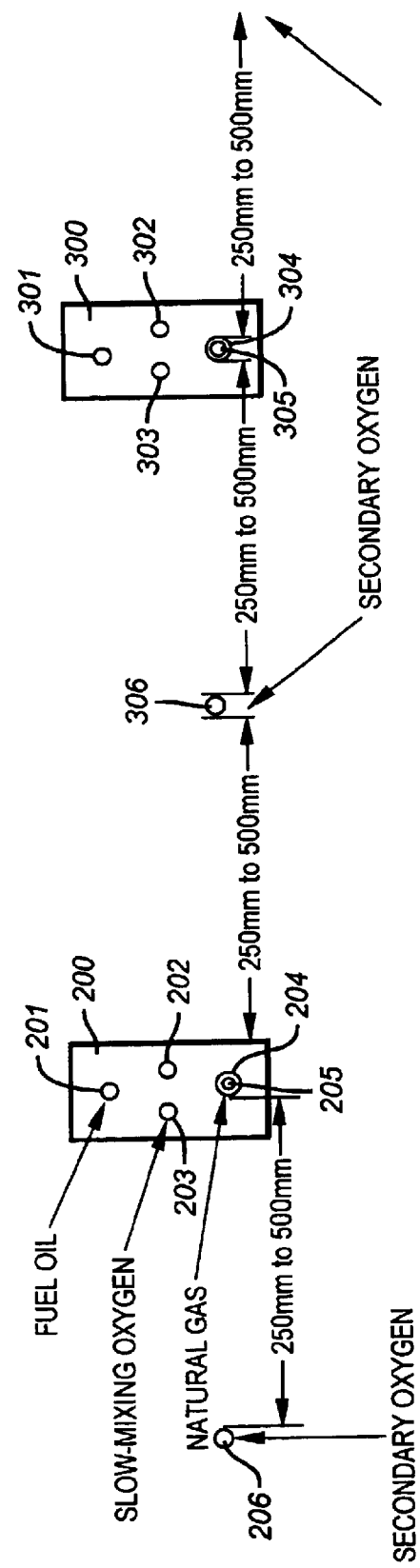

FIG. 6 shows a schematic alternative embodiment of the system according to the invention, comprising two refractory blocks 200, 300 having, from the top downward, a fuel oil injection port 201 and 301 respectively, two natural gas injection ports 202, 203 and 302, 303 respectively, two coaxial injection ports, for oxygen at the center and for fuel on the periphery, 205, 204 and 305, 304 respectively, and secondary oxygen injection into an injector 206 and 306 respectively, placed at a distance $d_2$ from the coaxial ports.

Figure 7:
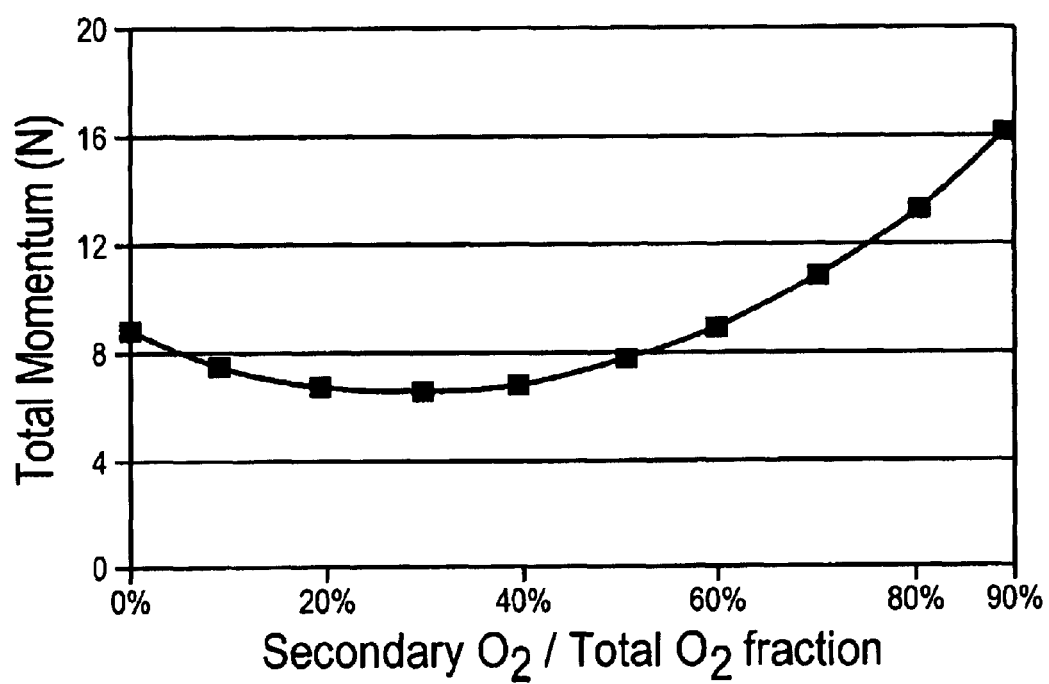

FIG. 7 shows the total flame momentum as a function of the ratio representing the fraction of the amount of secondary oxygen divided by the amount of total oxygen. This momentum has a minimum for a ratio of about 30% and then increases, reaching higher values than the value of the momentum when there is no secondary oxygen injection, for a ratio of greater than 60%.

What is claimed is:

1. A method of combustion in a furnace comprising the steps of:
   i) injecting at least one fuel and at least one oxidizer separately, wherein said oxidizer comprises a primary oxidizer stream and a secondary oxidizer stream, wherein said primary oxidizer stream is further divided into at least two portions, wherein the first is a rapid-mixing stream and the second is a slow-mixing stream;
   ii) injecting the first rapid-mixing stream close to the fuel whereby generating a first incomplete combustion rapidly;
   iii) injecting the second slow-mixing stream at a distance $d_1$ from said first rapid-mixing stream, whereby the mixing of fuel and oxidizer occurs less rapidly than that of the first incomplete combustion; and
   iv) injecting said secondary oxidizer stream downstream from said primary oxidizer stream whereby entering into combustion with the portion of fuel that is diluted by the unreactive gases from the first incomplete combustion.

2. The method according to claim 1, wherein said distance $d_1$ is less than or equal to about 30 cm.

3. The method according to claim 1, wherein said distance $d_1$ is about 25 cm.

4. The method according to claim 1, wherein $d_3$ is the diameter of the port of the slow-mixing stream and said distance $d_1$ is less than or equal to about ten times $d_3$.

5. The method according to claim 1, wherein the sum of the primary and secondary oxidizer streams is substantially stoichiometric with respect to the flow of fuel.

6. The method according to claim 5, wherein said sum is within a range of about ±15% with respect to the stoichiometric flow.

7. The method according to claim 1, wherein said secondary oxidizer stream is further divided into at least two streams.

8. The method according to claim 1, wherein the amount of said secondary oxidizer is from about 0% to about 90% of the total amount of injected oxidizer.

9. The method according to claim 8, wherein the amount of said secondary oxidizer is from about 10% to about 90%.

10. The method according to claim 1, wherein the total amount of said injected oxidizer comprises:
   a. a secondary oxidizer from about 50% to about 90%; and
   b. a primary oxidizer from about 10% to about 50%.

11. The method according to claim 10, wherein the total amount of said injected oxidizer comprises:
   a. a secondary oxidizer from about 60% to about 80%; and
   b. a primary oxidizer from about 20% to about 40%.

12. The method according to claim 7, wherein the sum of the cross sectional areas of the secondary oxidizer injection ports is greater than or equal to about 2.5 cm$^2$.

13. The method according to claim 12, wherein $d_2$ is the distance from said rapid-mixing stream to slow-mixing stream,
   wherein $d_2$ is equal to or greater than about 5 times the diameter D of the circle equivalent to the secondary oxidizer injection port, and
   wherein said $d_2$ is equal to or greater than the distance ($d_1$) from the second primary stream to the first primary stream.

14. The method according to claim 13, wherein said $d_2$ ranges from about 10 D to about 50 D.

15. The method according to claim 1, wherein the total amount of said oxidizer comprises:
   a. a rapid-mixing first stream from about 5 to about 40 vol %;
   b. a slow-mixing second stream from about 5 to about 95 vol %; and
   c. a secondary oxidizer stream comprises the remainder balance.

16. The method according to claim 1, wherein said slow-mixing second stream comprises at least two streams.

17. The method according to claim 16, wherein said slow-mixing stream comprises two substantially identical streams injected at approximately the same distance $d_1$ from the rapid-mixing stream, and
   wherein the three streams are located substantially in the same plane.

18. The method according to claim 17, wherein at least one said slow-mixing stream is not located in the same plane formed by the rapid-mixing and secondary oxidizer streams.

19. The method according to claim 1, wherein at least two slow-mixing streams are arranged uniformly around the rapid-mixing stream.

20. The method according to claim 17, wherein at least two slow-mixing streams are arranged symmetrically with respect to a plane comprising the rapid-mixing stream.

21. The method according to claim 1, wherein the fuel injection velocity is greater than about 20 m/s.

22. The method according to claim 1, wherein the fuel injection velocity is less than or equal to about Mach 2.

23. The method according to claim 1, wherein the fuel injection velocity ranges from about 20 m/s to about 300 m/s.

24. The method according to claim 1, wherein said method further comprises:
   v. preheating the fuel before it is injected.

25. The method according to claim 24, wherein said method further comprises pulsating the fuel during its injection, and wherein the frequency of said pulses ranges from about 0.1 to about 3 Hz.

26. The method according to claim 25, wherein said frequency ranges from about 0.1 to about 1 Hz.

27. The method according to claim 1, wherein the rapid-mixing stream injection velocity ranges from about 20 m/s to about Mach 2.

28. The method according to claim 1, wherein the slow-mixing stream injection velocity ranges from about 10 m/s to about Mach 1.

29. The method according to claim 1, wherein the secondary stream injection velocity ranges from about 20 m/s to about Mach 2.

30. The method according to claim 1, wherein said method further comprises:
   vi. preheating at least one oxidizer stream before it is injected so as to generate a velocity no greater than about Mach 2.

31. The method according to claim 30, wherein said method further comprises pulsating at least one of said oxidizer streams during its injection, and wherein the frequency of said pulses ranges from about 0.1 to about 3 Hz.

32. The method according to claim 31, wherein said frequency ranges from about 0.1 to about 1 Hz.

33. The method according to claim 1, wherein said secondary oxidizer comprises a mixture of air and oxygen.

34. The method according to claim 33, wherein said air is preheated.

35. The method according to claim 33, wherein said air provides from about 5% to about 80% by volume of the total oxygen of the secondary oxidizer, and wherein the balance is provided by oxygen-enriched air or substantially pure oxygen.

36. The method according to claim 35, wherein said volume of oxygen is from about 15% to about 40%.

37. The method according to claim 1, wherein only one or several fuel(s) are injected.

38. A separate-injection burner apparatus formed from a block comprising:
   i) at least one fuel injection port further comprising at least one longitudinal axis of symmetry in the fuel's direction;
   ii) at least one oxidizer injection port further comprising:
      a. a first oxidizer injector port with at least one longitudinal axis of symmetry, located in the fuel injection port;
      b. a second oxidizer injection port located at a distance $d_1$ from the axis of symmetry of said first oxidizer injector; and
   wherein $d_1$ is equal or smaller than about 30 cm, and wherein said longitudinal axes of symmetry are substantially parallel.

39. The apparatus according to claim 38, wherein said apparatus further comprise:
   iii) at least one second block which further comprises a third oxidizer injection port with a diameter D,
   wherein said port is located at a distance $d_2$ from the axis of symmetry of said first oxidizer injection port, and wherein $d_2$ greater than or equal to about 5 D, and wherein $d_2$ is greater than or equal to $d_1$.

40. The apparatus according to claim 39, wherein said distance, $d_2$ ranges from about 10 D to about 50 D.

41. The apparatus according to claim 39, wherein said $d_1$ is less than or equal to about 10 times the diameter of the slow-mixing port $d_3$.

42. The apparatus according to claim 38, wherein the diameter, D is greater than or equal to about 0.5 cm.

43. The apparatus according to claim 38, wherein said block further comprises at least two fuel injection ports.

44. The apparatus according to claim 38, wherein said block further comprises at least two first oxidizer injection ports.

45. The apparatus according to claim 38, wherein said block further comprises at least two second oxidizer injection ports.

46. The apparatus according to claim 38, wherein said fuel injection port comprises a heavy fuel oil injector.

47. The apparatus according to claim 38, wherein said block comprises at least two fuel injection ports, and wherein said ports provide the means for injecting at least one fuel.

48. The apparatus according to claim 38, wherein said apparatus further comprises:
  iv) a first flow-dividing valve for dividing the total flow of oxidizer, into a primary and secondary oxidizer lines, and wherein said secondary oxidizer line is connected to a third oxidizer injection port, and wherein said primary oxidizer line is connected to a second flow-dividing valve that is connected to the first and second oxidizer injection ports.

49. The apparatus according to claim 48, wherein said third secondary oxidizer injection port comprises two cross sections, so as to vary the velocity and the momentum of the oxidizer without modifying the pressure of the oxidizer upstream of the injector.

* * * * *

UNITED STATES PATENT AND TRADEMARK OFFICE
CERTIFICATE OF CORRECTION

PATENT NO. : 6,910,879 B2
DATED : June 28, 2005
INVENTOR(S) : Jacques Dugue et al.

It is certified that error appears in the above-identified patent and that said Letters Patent is hereby corrected as shown below:

Column 8,
Line 63, replace the words "claim 1" with the words -- claim 2 --.

Column 10,
Line 63, replace the word "comprise" with the word -- comprises --.

Signed and Sealed this

Sixth Day of September, 2005

JON W. DUDAS
*Director of the United States Patent and Trademark Office*